United States Patent
Lee et al.

(10) Patent No.: US 8,760,486 B2
(45) Date of Patent: Jun. 24, 2014

(54) METHOD FOR PROVIDING PHONE BOOK USING BUSINESS CARD RECOGNITION IN MOBILE COMMUNICATION TERMINAL AND MOBILE COMMUNICATION TERMINAL USING THE METHOD

(75) Inventors: Young-In Lee, Bucheon-si (KR); Jae-Bin Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1522 days.

(21) Appl. No.: 11/486,204

(22) Filed: Jul. 13, 2006

(65) Prior Publication Data
US 2007/0013769 A1    Jan. 18, 2007

(30) Foreign Application Priority Data

Jul. 13, 2005   (KR) .................. 10-2005-0063134

(51) Int. Cl.
    *H04N 7/14*    (2006.01)
(52) U.S. Cl.
    CPC ...................................... *H04N 7/14* (2013.01)
    USPC .................. 348/14.01; 348/14.02; 379/90.01; 379/355.01
(58) Field of Classification Search
    CPC .... H04M 1/2755; H04N 2007/00; H04N 7/14
    USPC .............. 348/14.01–14.16; 379/90.01, 93.05, 379/355.01, 355.02; 382/173
    See application file for complete search history.

(56) References Cited

U.S. PATENT DOCUMENTS

2001/0044324 A1 * 11/2001 Carayiannis et al. ......... 455/564
2005/0037806 A1 *  2/2005 Na ............................. 455/556.1

FOREIGN PATENT DOCUMENTS

JP         2003303180 A  * 10/2003
KR    10-2004-0017376        2/2004

* cited by examiner

*Primary Examiner* — Melur Ramakrishnaiah
(74) *Attorney, Agent, or Firm* — The Farrell Law Firm, P.C.

(57) ABSTRACT

Provided is a method for providing a phone book using business card recognition in a mobile communication terminal. An image of a business card is captured and recognized character fields from the captured image are searched. Any one of the searched character fields to be set as a name is selected. The selected character field is converted to text and set as the name. The captured image is stored with the name in a predetermined directory. In addition, it enables to use all functions available in an existing phone book, thereby being more convenient to the user.

12 Claims, 3 Drawing Sheets

METHOD FOR PROVIDING PHONE BOOK USING BUSINESS CARD RECOGNITION IN MOBILE COMMUNICATION TERMINAL AND MOBILE COMMUNICATION TERMINAL USING THE METHOD

PRIORITY

This application claims priority under 35 U.S.C. §119 to an application entitled "Method for Providing Phone Book Using Business Card Recognition in Mobile Communication Terminal And Mobile Communication Terminal Using The Method" filed in the Korean Intellectual Property Office on Jul. 13, 2005 and assigned Serial No. 2005-63134, the contents of which are incorporated herein by reference.

BACKGROUND OF THE INVENTION

1. Field of the Invention

The present invention relates generally to a method for providing a phone book in a mobile communication terminal, and in particular, to a method for providing a phone book using business card recognition in a mobile communication terminal.

2. Description of the Related Art

Mobile communication terminals are widely used due to their convenient portability. Mobile communication terminal manufacturers are developing mobile communication terminals with more advanced functions, in an effort to secure more users. For example, the mobile communication terminals provide various functions including, but not limited to, a phone book, a game, a scheduler, a short message, an internet, an e-mail, an alarm, a MP3 (MPEG Audio Layer-3), a digital camera and an electronic dictionary.

A conventional mobile communication terminal has a memory storing a plurality of phone numbers and personal names corresponding to each phone numbers. It has a function to make a call to a phone number retrieved by a name stored in memory. The phone numbers are stored in a phone book in the mobile communication terminal. When a user searches the phone book by pressing predetermined keys of a key pad, the corresponding phone number is displayed on a Liquid Crystal Display (LCD) screen.

A business card generally contains effective and important personal data. The business card provides names of a person and a company, a position held, phone numbers such as mobile, company and home, together with other contact information such as an email and an address, etc. The user can extracts required data from the business card and stores such data in the phone book of the mobile communication terminal, where the user can manage the data stored therein. Also, the data stored in the phone book can be used for functions such as call connection, Short Message Service (SMS), fax or email.

However, inputting the data from business cards into the mobile communication terminal requires manual work. Consequently, where the users have two or more business cards, it takes a sufficient amount of time to manually input data from the business cards into the phone book of the mobile communication terminal. This gives rise to inaccuracy and makes it difficult to manage the data. As such, where there are many stored items, in addition to the phone book, the search for stored phone numbers can be a tedious and troublesome task to the users, thereby inconveniencing the user.

SUMMARY OF THE INVENTION

It is, therefore, an object of the present invention is to provide a method for providing a phone book using business card recognition in a mobile communication terminal.

Another object of the present invention is to provide a method for equally using a phone book as a previous phone book containing a business card image photographed with a camera in a mobile communication terminal.

A further object of the present invention is to provide a method for using functions of call connection, SMS or e-mail using the business card image stored in the mobile communication terminal.

According to still another aspect of the present invention, there is provided a method for providing a phone book using business card recognition in a mobile communication terminal that includes capturing an image of a business card, searching character recognized fields from the captured image and displaying them, selecting a field to be set as a name from the searched fields and setting a name by converting the selected field to text and storing the captured image with the name in a predetermined directory.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the present invention in unnecessary detail.

Figure 1:
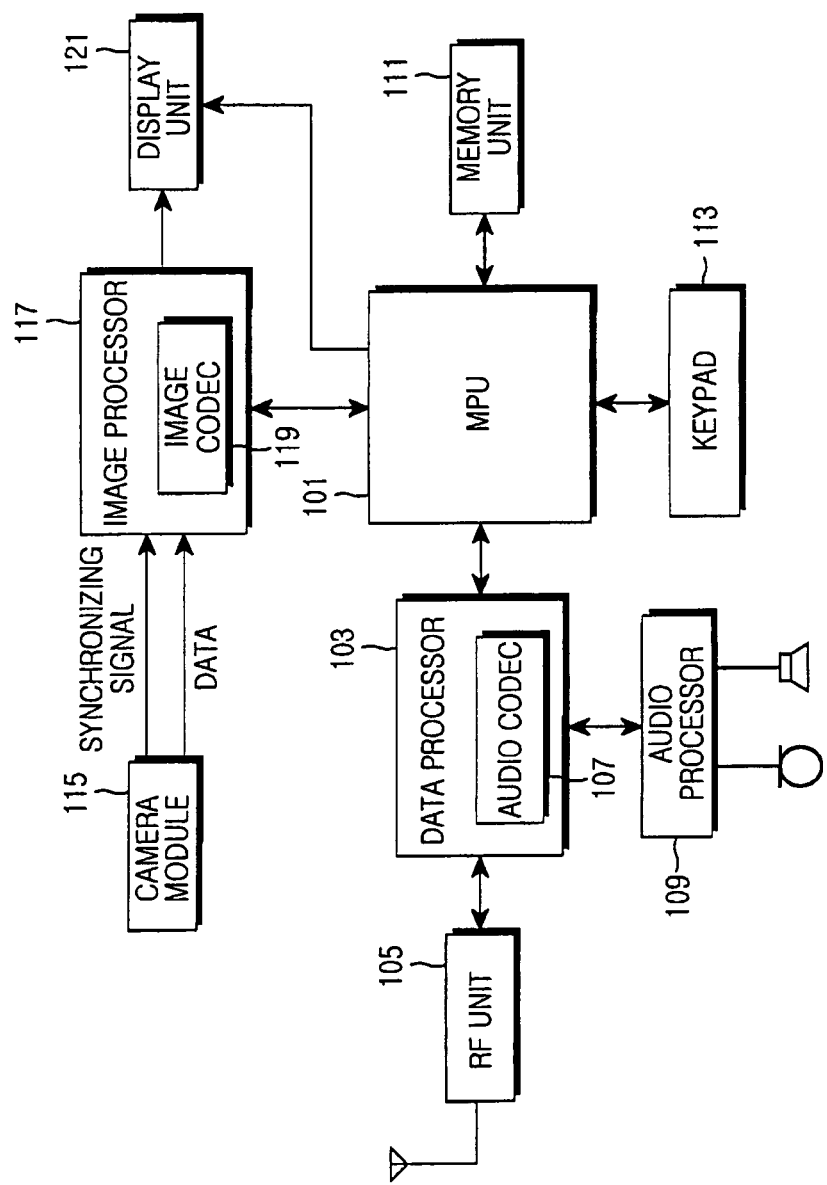
FIG. 1 is a block diagram of a mobile communication terminal according to the present invention.

FIG. 1 illustrates a block diagram of a mobile communication terminal according to the present invention. The mobile terminal includes a cellular phone, a Personal Communication System (PCS), a Personal Data Assistant (PDA) and an international mobile communication-2000 (IMT2000) and the like. The following description will now be provided in view of general structures of the above terminals.

Referring to FIG. 1, a Micro-Processor Unit (MPU) 101 that controls an overall operation of the portable terminal having a function of motion recognition. For example, the MPU 101 is responsible for processing and controlling voice communication and data communication. In addition to the typical functions, the MPU 100 processes functions for providing a phone book using business card recognition. Here, a detailed description of the typical processing and controlling operation of the MPU 101 will be omitted.

A memory unit 111 includes a program memory, a data memory and a flash Read Only Memory (ROM). The program memory stores a microcode of a program for processing and controlling the MPU 101 and all reference data, and in particular, for providing a phone book using business card recognition. The data memory, which is a working memory of the MPU 101, stores temporary data being generated while all programs are performed. The flash ROM stores various updatable data, and in particular, business card images according to the present invention.

A keypad which is a input unit, 113 includes numeric keys of digits 0-9 and a plurality of function keys, such as a MENU key, a CANCEL (REMOVE) key, an ENTER key, a TALK key, an END key, an internet connection key, navigation keys (or direction keys) (▲/▼/◄/►). The key input data corresponding to a key pressed by a user is transmitted to the MPU 101. A display unit 121 displays status information generated during the operation of the mobile communication terminal, a restricted number of characters as well as also moving pictures and still pictures. The display unit 121 may be a color LCD (Liquid Crystal Display).

Radio Frequency (RF) unit 105 includes an RF transmitter for increasing and amplifying a frequency of a transmission signal and a RF receiver for low noise amplifying and dropping a frequency of a reception signal. A data processor 103 has a transmitter for modulating and encoding the transmission signal and a receiver for demodulating and decoding the reception signal. That is, the data processor 103 is composed of a MODEM and a CODEC Coder-Decoder. (CODEC) Here, the CODEC is further equipped with a data codec for processing packet data and an audio codec 107 for processing audio signals such as voice. An audio processor 109 plays reception audio signals output through the audio codec 107 or transmits a transmission audio signals received through a microphone to the audio codec 107.

A camera module 115 has a camera sensor for converting an optical signal sensed while taking pictures to an electric signal and a signal processor for converting an analog signal taken from the camera sensor to digital data. Here, the camera sensor and the signal processor may be implicated as a Charge Coupled Device (CCD) sensor and a Digital Signal Processor (DSP), respectively.

An image processor 117 produces screen data for displaying image signal outputs from the camera module 115. The image processor 117 processes the image signals in frames and outputs them by adaptively adjusting to character and size of the display unit 121. Also, the image processor 117 has an image codec 119, and the image codec encodes image signals at the set scheme or decodes the coded frame image data to the original frame data. The image processor 117 produces and plays moving pictures according to mode set under the control of the MPU 101.

Figure 2:
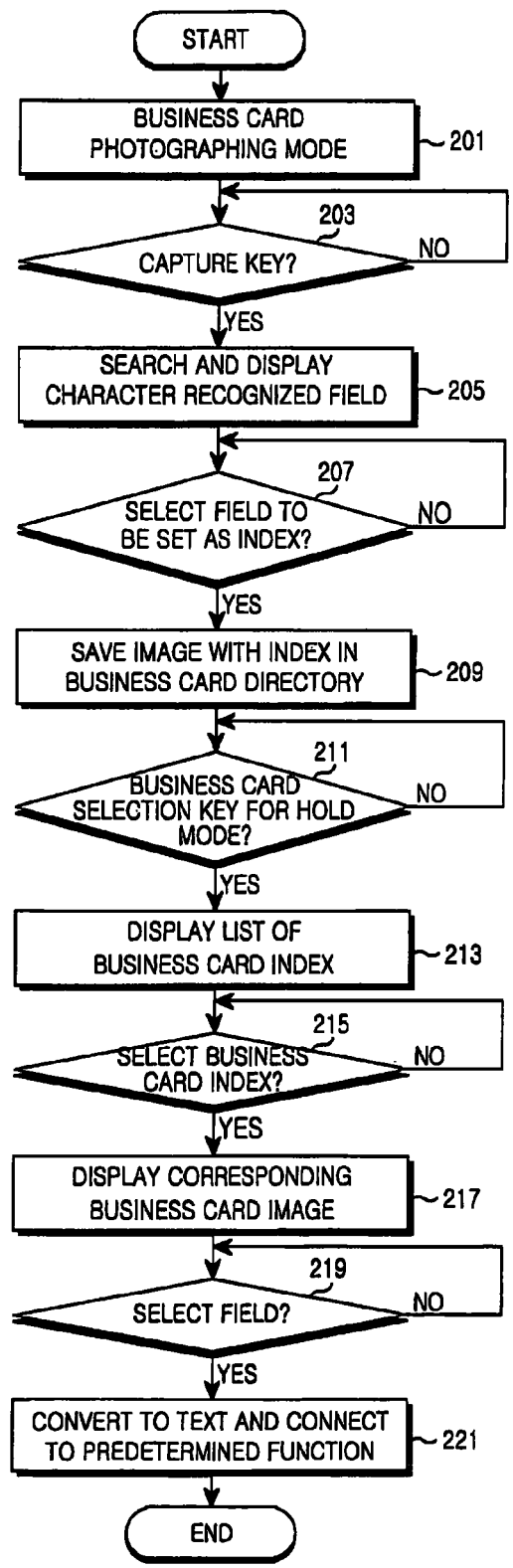
FIG. 2 is a flowchart diagram illustrating a method for providing a phone book using a business card recognition in a mobile communication terminal according to the present invention.

FIG. 2 is a flowchart diagram illustrating a method of providing a phone book using business card recognition in a mobile communication terminal according to the present invention.

Referring to FIG. 2, the MPU 101 set the terminal to business card photographing mode in step 201. Here, the business card photographing mode of step 201 represents the mode of capturing the business card using a digital camera in the terminal Following which, the MPU 101 proceeds to step 203 to check if there is key input for capturing a business card. When the key input is sensed, the MPU 101 proceeds to step 205, where it captures an image of the business card, scans it, searches the fields recognized as characters in the image, and then displays them on the display unit 121. Any one of the searched fields, for example, such as field 309 in FIG. 3, can be selected as a header of fields. It may be displayed in an enlarged scale. Hereinafter, a captured image of the business card displayed on the display unit 121 is called a business card image.

In step 207, the MPU 101 checks if there is key input for selecting a field to set as an index among the character fields. A user may select the field and display it in an enlarged scale by using direction keys such as a down key or an up key. Here, a name of index is designated in order to store the business card in a business card directory. The business directory indicates a separate directory for storing the captured business image. The index name is designated by the text converted field name after key input for selecting one field among the searched fields. For example, if the field of 'MOBILE: 010-9990-0000' among the character fields is selected as the index, the MPU 101 can store the business card image with the index of 'MOBILE: 010-9990-0000' in the business card directory. Also, the user may designate an arbitrary name and store the image with this name.

When selecting the field for the index, the MPU 101 proceeds to step 209 to scan the selected field and convert it to text. The text is designated as an index and the business card image is stored in the business card directory with the text. Here, the index of the business card is added to an index list of the business card directory. The MPU 101 may display the updated business card index list on the display unit 121.

The MPU 101 proceeds to step 211 to check if there is a key input for selecting the business card directory. Upon sensing the key input, the MPU 101 proceeds to step 213 where it displays the index list of the business card directory on the display unit 121 in step 213.

In step 215, the MPU 101 checks if there is an index of the business card according to key input by the user. If the index selection is sensed, the MPU 101 extracts the stored business card image from the memory unit 111, searches the character fields from the business card image through scanning and displays them on the display unit 121. The user may select the first of the fields and display it in an enlarged scale.

The MPU 101 proceeds to step 219 to check if there is a field selected according to key input by the user. If the field selection is sensed, the MPU 101 converts the selected field to text. The MPU 101 uses a predetermined function supported by the terminal according to the text such as a telephone number, a mobile phone number, a fax number, an email address and so on in step 221. That is, it can use text number or the address converted from the image as the number or address of phonebook.

For example, if the text is a telephone number, the predetermined function supported by the terminal can be call connection and the MPU 101 then calls to the telephone number. For another example, if the text is a mobile number, the predetermined function supported by the terminal can be call connection or SMS. The MPU 101 displays on the display unit 121 to select either call connection or SMS transmission, using the mobile phone number, and can perform the corresponding function according to the user's selection. For another example, if the text is an email address, the predetermined function supported by the terminal can be an email, and thus, the MPU 101 converts to an email input mode and requires writing an email message according to key input by the user. Then, the email message can be transmitted to the email address when the email transmission is requested.

User may edit the converted text in case of scanning errors occurring during conversion to text for the field. Then, the MPU 101 terminates the algorithm.

Figure 3:
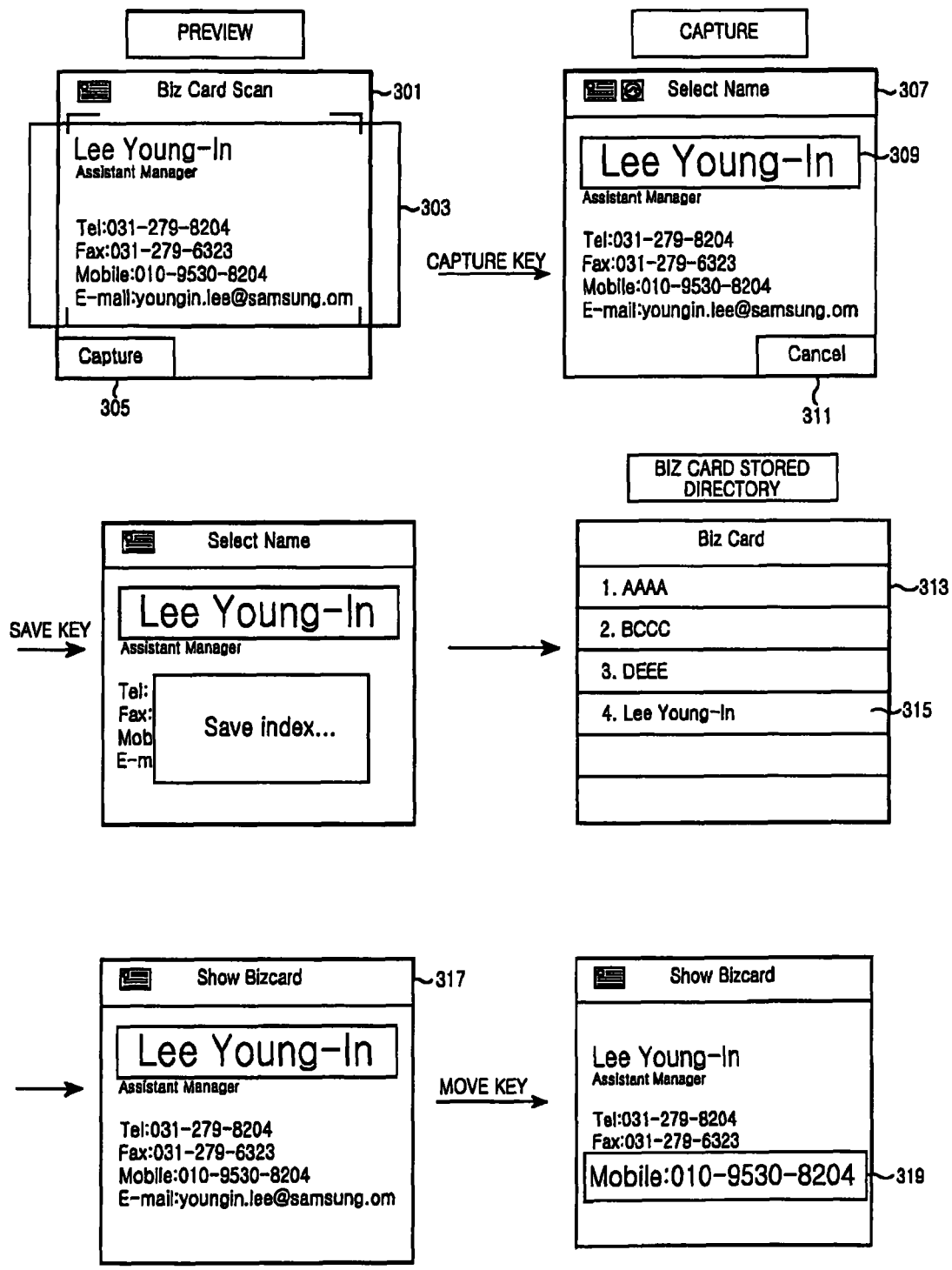
FIG. 3 is an illustration of showing a phone book using business card recognition in a mobile communication terminal according to the present invention.

FIG. 3 is an illustration showing a phone book using business card recognition in a mobile communication terminal according to the present invention.

Referring to FIG. 3, a user sets the terminal to business card photographing mode 301 and captures an image of a business card 303 by selecting a capture key 305. After scanning the image, the character fields 307 are displayed on display unit 121 of the terminal and a first field 309 among the character fields 307 is displayed in an enlarged scale. When the user selects one field (for example 309) among the character fields 307 by using direction keys, the selected field 309 is converted to text and used as an index for storing the captured image. Here, the user may press a cancel key 311 to recapture the business card 303. When the cancel key 311 is selected, the terminal converts to the business card photographing mode to recapture the business card.

If the user selects any one of the fields 307 and selects a save key, an index list of a business card directory 313 is displayed and the business card image 307 is stored with the index 309.

Thereafter, the user selects the business card directory 313 in order to transmit SMS or call to a receiver. Here, the index list of the business card directory 313 is displayed on the display unit 121. Upon the selection of the index 315, the captured image 317 is displayed on the display unit121. The captured image is to be displayed on the character field 307 on the display unit 121 of the terminal through the scanning. A first field 309 of the character fields 307 may be displayed in an enlarged scale. The user can select another field 319 by direction keys, and after the selection of the field 319, the field 319 is converted to text and can connect with a predetermined function according to the converted text. The predetermined functions include functions of call connection, a SMS, a fax, an email and the like.

As described above, the present invention advantageously enables to store an image taken from business card recognition in a separate directory. Thus, compared with the conventional phone book, it can simultaneously show a phone number and the other information through the entire business cards in a business card directory, without searching a phone number and searching the stored contents by scrolling up or down. Also, it reduces inconvenience that a user can experience input the images one by one in the phone book and enables the user to use all functions available in an existing phone book by taking an image of a business card, thereby being more convenient to the user.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method in a mobile communication terminal, comprising the steps of:
    capturing an image of a business card;
    searching at least one field recognized as characters from the captured image;
    selecting a field to be set as an index for the captured image among the searched at least one field;
    designating the selected field as a name of an index for storing the business card in a business card directory; and
    storing the captured business card with the name of the index.

2. The method of claim 1, further comprising:
    displaying the at least one field after searching the at least one field.

3. The method of claim 1, wherein all steps of claim 1 are processed at least two times to create an index list in a directory.

4. The method of claim 1, further comprising:
    displaying the index list on a display unit;
    selecting one index in the displayed index list;
    displaying the captured image of the business card corresponding to the selected one index;
    converting a plurality of fields of the captured image to a plurality of texts; and
    displaying the plurality of texts of fields of the captured image on the display unit.

5. The method of claim 4, further comprising:
    selecting one text among the plurality of texts of fields; and
    performing a function corresponding to the selected one text.

6. The method of claim 5, wherein the function is at least one of a call connection, a Short Message Service (SMS), a fax or an e-mail function.

7. A mobile communication terminal, comprising:
    a processor configured to capture an image of a business card, search at least one field recognized as characters from the captured image, select a field to be set as an index for the captured image among the searched at least one field, designate the selected field as a name of an index for storing the business card in a business card directory; and
    store the captured business card with the name of the index.

8. The terminal of claim 7, wherein the processor is further configured to display the at least one field after searching the at least one field.

9. The terminal of claim 7, wherein the processor is further configured to process the capture, search, select, convert and store steps at least two times to create an index list in a directory.

10. The terminal of claim 7, wherein the processor is further configured to:
    display the index list on a display unit;
    select one index in the displayed index list;
    display the captured image of the business card corresponding to the selected one index; convert a plurality of fields of the captured image to a plurality of texts; and
    display the plurality of texts of fields of the captured image on the display unit.

11. The terminal of claim 10, wherein the processor is further configured to:
    select one text among the plurality of texts of fields; and
    perform a function corresponding to the selected one text.

12. The terminal of claim 11, wherein the function is at least one of a call connection, a Short Message Service (SMS), a fax or an e-mail function.

* * * * *